Dec. 27, 1966  F. BRESSAN  3,294,073
ATTACHMENT FOR INTERNAL COMBUSTION ENGINES FOR REDUCING
NOXIOUS GASES IN THE EXHAUST
Filed May 6, 1964

INVENTOR
Ferruccio Bressan
BY
Pennie, Edmonds, Morton, Barrows & Taylor
ATTORNEYS United States Patent Office
3,294,073
Patented Dec. 27, 1966

3,294,073
ATTACHMENT FOR INTERNAL COMBUSTION ENGINES FOR REDUCING NOXIOUS GASES IN THE EXHAUST
Ferruccio Bressan, Bronx, N.Y., assignor of twenty percent to Irwin I. Lubowe, thirty-seven and one-half percent to Jerihem Seeman, both of New York, N.Y., and five percent to Herman L. Mehr, Rockville Centre, N.Y.
Filed May 6, 1964, Ser. No. 369,650
5 Claims. (Cl. 123—119)

This application is a continuation-in-part of the applicant's co-pending application Serial No. 72,827, filed October 31, 1960, now abandoned and entitled "Operation of Internal Combustion Engines."

This invention relates to improvements in internal combustion engines such as automobile engines and includes an improved apparatus and combination of apparatus by which the noxious gases contained in the engine exhaust are greatly reduced. The specific fuel consumption is also reduced, and the operation of the engine is generally improved.

The improved apparatus of the invention includes an attachment made up of elements for returning a small and predetermined amount of the hot gases from the exhaust pipe to the intake manifold at a sufficiently high temperature that will increase to a limited extent the temperature of the gases entering the intake manifold from the carburetor such increase in temperature being from about 25° to 35° F. The attachment includes connecting means for connecting it to the exhaust pipe at a point near the engine and where the exhaust gases are at a high temperature, a screen or strainer for straining or filtering the hot gases, a restricted orifice for determining the volume of gases passing therethrough to be returned to the manifold, and a connecting pipe to be located between the carburetor and the intake manifold. The attachment advantageously also includes a distributing plate disposed between the carburetor and intake manifold and to which the outlet of the connecting pipe is connected.

The invention also includes an internal combustion engine and such an attachment combined therewith whereby exhaust gases can be taken from the exhaust pipe of the engine, screened and returned continuously in a small and predetermined amount and admixed with the mixture of air and gasoline entering the intake manifold from the carburetor. I have found that the recycling of an amount of hot exhaust gases amounting to that which will pass a metering orifice having an area of the order of 50% of the total fuel jet area of the carburetor results in the improved operation of the engine. The gases which are thus recycled at a high temperature are the exhaust gases which are the products of combustion of the engine and contain carbon dioxide and water vapor, as well as nitrogen. These recycled gases have a modifying effect on the combustion process with the result that a more effective and complete combustion in the engine cylinders appears to be accomplished with the resulting substantial reduction in carbon monoxide in the exhaust gases.

The attachment of the invention can be separately manufactured and sold, and installed on existing automobile engines. It includes a strainer or screening device which is to be connected with the exhaust pipe for removing solid particles from the exhaust gases passing through the device. It includes an orifice the cross sectional area of which is of the order of 50% of the total fuel jet area of the carburetor for controlling and regulating the volume of hot exhaust gases passing therethrough to the engine manifold. It includes a connecting pipe leading to the distributing plate and distributing plate suitable for location between the carburetor and the intake manifold for admixing the recycled hot gases with the gases passing from the carburetor to the intake manifold. This attachment can readily be installed on an ordinary automobile merely by attaching it at one end to the exhaust pipe to permit entrance of exhaust gases and by mounting the distributing plate between the carburetor and the intake manifold.

The combination of apparatus which results from the installation of this attachment on an automobile engine produces a substantial reduction in the noxious gases in the engine exhaust, and also an improvement in efficiency and economy of operation of the engine.

The invention will be further described in connection with the accompanying drawings which illustrate in a somewhat diagrammatic manner an internal combustion engine with the improved attachment installed thereon together with certain details of the attachment and modifications thereof.

Figure 1:
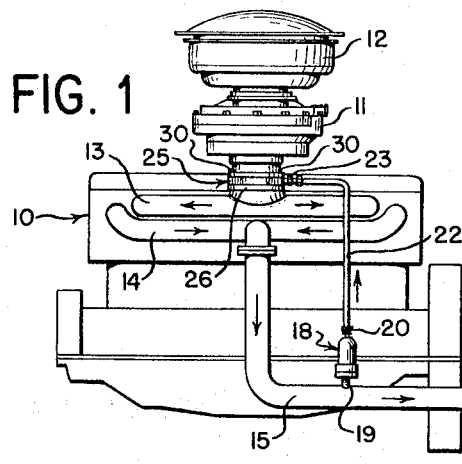
FIG. 1 is a diagrammatic side elevation of an automobile engine having my invention applied thereto.

Referring now to these drawings there is illustrated in FIG. 1 a six-cylinder automobile engine 10 having a carburetor 11 and air cleaner 12. Beneath carburetor 11 there is an intake manifold 13 and below this is an exhaust manifold 14 which is connected by an exhaust pipe 15 to a muffler 16, the usual tail pipe 17 being provided therebeyond, all of conventional construction.

A strainer or screen casing 18 is mounted in vertical position on top of exhaust pipe 15 and as close as convenient to manifold 14. Strainer casing 18 is mounted on the exhaust pipe by means of a connection 19 in the form of a nipple or short piece of one-quarter inch tubing, inside diameter.

Threaded into the top of strainer casing 18 there is a connecting member 20 having therein a metering orifice 21, and extending upward from member 20 there is a tube 22, advantageously of copper or aluminum, of about one quarter inch inside diameter. The upper end portion of tube 22 is bent to horizontal position and is joined by a coupling 23 to a projecting threaded connection 24 (see FIG. 3) on a distributing plate 25 which has been inserted between the outlet of carburetor 11 and the inlet flange 26 of intake manifold 13.

It will be understood that carburetor 11 has two barrels and, consequently, distributing plate 25 is provided with two vertical passageways 27 and 28 so that the air and fuel mixture produced by the carburetor passes through these respective passageways and into separate channels (not shown) which are cored in the intake manifold 13. The conventional arrangement is that one of these channels feeds one half of the cylinders, and the other channel feeds the remainder of the cylinders. However, if desired, the two barrels may be connected to a common intake manifold which feeds all of the cylinders.

Figure 3:
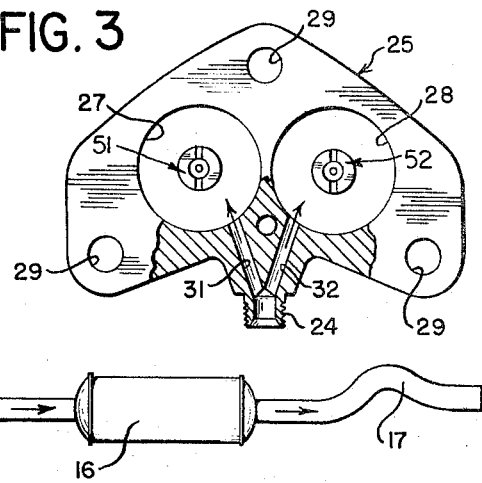
FIG. 3 is a plan view showing a distributing plate for use with an engine equipped with a two-barrel carburetor, a portion being broken away and shown in section.

Inasmuch as carburetor 11 has two barrels it also has two fuel jets 51 and 52 which have been indicated diagrammatical in FIG. 3 as being disposed in alignment with the two vertical passageways 27 and 28, although the actual location of the fuel jets depends upon the design of the carburetor.

Distributing plate 25 is also provided with three holes 29 which are suitably arranged to received the carburetor mounting screws 30. Leading from the entrance opening within connection 24 are two diverging passages 31 and 32 which distribute the hot exhaust gases to the respective passageways 27 and 28 so that these gases mix with the two streams of air and fuel mixture from the carburetor and flowing into intake manifold 13.

Figure 2:
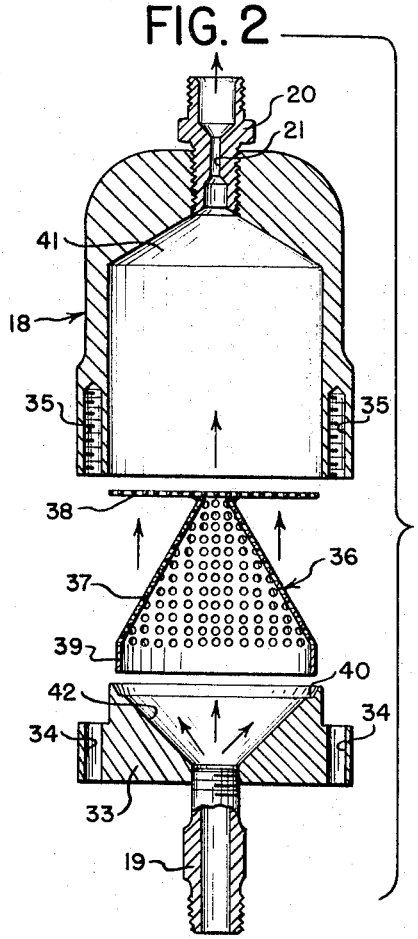
FIG. 2 shows the strainer casing and parts thereof in an enlarged exploded view in central vertical section.

Referring now to FIG. 2 strainer or screen casing 18 has a bottom member 33 which is held in place against the bottom of casing 18 by screws (not shown) passing through openings 34 in the base and received in threaded holes 35 in the casing. Within casing 18 there is a screening device indicated generally by numeral 36. This device has two sections, a conical screen section 37 and a disc-like screen 38, the arrangement being such that the gases flowing upwardly through connection 19 pass first through the conical section 37 and then through the disc section 38. Below conical section 37 the device has a short cylindrical section 39 which rests upon a circular groove 40 in the top of base 33. When the parts are assembled this arrangement compels the gases to flow through the conical section 37.

Disc screening section 38 is somewhat larger than cylindrical portion of casing 18 which is below a conical discharge area 41 which serves to direct the gases through the metering orifice 21. Disc screen 38 is fixed by welding or otherwise to the apex of cone screen 37. Base 33 is of substantial thickness so as to provide therein a dish-shaped bottom, advantageously in the form of an inverted cone 42. The upper end of connection 19 is disposed at the center and somewhat below the bottom of conical surface 42 so that material collecting on the conical surface may flow freely by gravity into connection 19. This occurs whenever the upward flow of gases ceases, as whenever the engine is stopped. The solid particles which have been removed by the screen sections thus are discharged into the exhaust pipe 15 and are carried out of the exhaust system the next time the engine is started.

Figure 4:
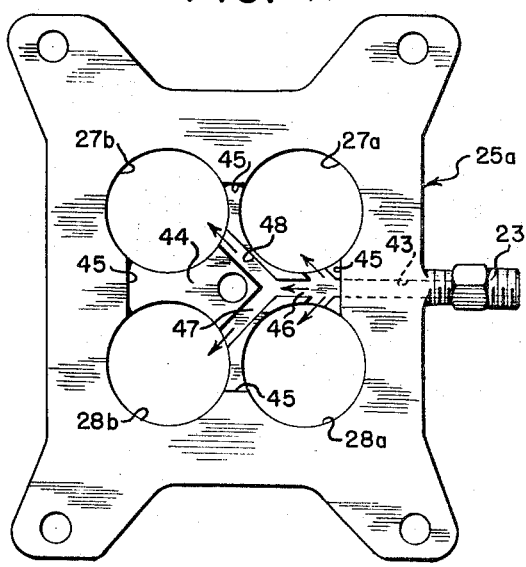
FIG. 4 is a view similar to FIG. 3 showing a distributing plate for an engine having a four-barrel carburetor.

FIG. 4 shows a modified form of distributing plate 25a which is provided with four vertical passageways 27a and 27b and 28a and 28b. On one of the engines on which the attachment has been tried out and which has a four-barrel carburetor, all four carburetor barrels are connected to a common passage or channel in the intake manifold from which the mixture of air and gasoline is distributed to the various engine cylinders. The distributing plate used on this engine is like the one shown in FIG. 4.

The recycled hot exhaust gases coming in through coupling 23 are conveyed through a main passage 43. This opens into a shallow space or recess 44 which is formed by milling away the metal from the surface of plate 25a to a depth of a little more than one-sixteenth of an inch. The metal between the four passageways is cut away in this manner to the extent indicated by the boundary lines 45. Hence, the recycled hot exhaust gases flow into all four of the passageways 27a, 27b and 28a and 28b. However, in order to direct and thus distribute these gases to each of the four passageways, an open channel 46 is milled in the bottom of recess 44 thus described, this channel being in line with main passage 43. Open channel 46 divides and forms two similar open channels 47 and 48 which serve to distribute some of the recycled hot gases to the passageways 27b and 28b.

A conventional arrangement with a four-barrel carburetor is to have one pair of the barrels connected in parallel with each other to a channel cored in the intake manifold which feeds one group of engine cylinders, the other pair of barrels also being connected in parallel to a separate cored channel and to the remaining cylinders. For an engine so constructed it will be understood that the distributing plate, as shown in FIG. 4, can be further modified so as to have closed, individual distributing passages leading from the main passage 43 to each of the four passageways 27a and 27b, and 28a and 28b, such closed distributing passages being similar to passages 31 of FIG. 3.

On the several engines on which my attachment has been tried I have found that by making the area of the metering orifice 21 equal to approximately 50 percent of the total carburetor gasoline jet area, the desired ratio of recycled hot gas to the volume of the air and gasoline mixture flowing from the carburetor to the manifold, will be produced.

When the attachment of the invention is installed on an automobile engine, the operation of the engine will be generally improved. The horsepower of the engine will be increased. The consumption of gasoline will be reduced. The engine will operate more smoothly, there will be more complete combustion, and noxious gases such as carbon monoxide will be reduced to a substantial extent. For example, in a test of a Willys "Hurricane" 4 cylinder, 75 H.P. engine, on which the attachment of the present invention was installed the carbon monoxide in the exhaust gases was reduced approximately ⅓ below the carbon monoxide contained in the exhaust gases when the engine was operated without the attachment.

This test was made on a dynamometer stand in the laboratory of a recognized institute of technology and in accordance with the measuring procedures outlined in the Society of Automotive Engineers' Test Code. The engine on which the attachment of the invention was tested had been overhauled, tuned and carefully adjusted for laboratory use immediately prior to this test so that the amount of carbon monoxide in the exhaust gases was at a minimum. Results on older engines not so carefully adjusted have shown a greater reduction in the amount of noxious gases including carbon monoxide.

I claim:

1. An attachment for internal combustion engines which have a carburetor having at least one fuel jet, an intake manifold leading from the carburetor to the engine cylinders and a pipe for the exhaust gases, said attachment comprising a connection for leading the hot gases to the intake manifold from a point in the exhaust pipe where the exhaust gases are at a high temperature, said connection including a screen for screening the hot gases and a metering orifice means having a fixed cross-sectional area which is one half the carburetor fuel jet area or small variations therefrom.

2. An attachment for internal combustion engines which have a carburetor having at least one fuel jet, an intake manifold leading from the carburetor to the engine cylinders and a pipe for the exhaust gases, said attachment comprising a casing having an inlet connected to the exhaust pipe at a point where the exhaust gases are at a high temperature, a screen in the casing for screening the hot gases, and a connecting pipe for leading the hot gases from the outlet of the casing to the intake manifold, said casing also having therein a metering orifice the area of which is of the order of one half the carburetor jet area.

3. An attachment for internal combustion engines as set forth in claim 2 wherein the casing is mounted in vertical position on the exhaust pipe, the bottom of the casing being dished so that solid particles removed from the gases by the screen tend to flow by gravity to the lowest point of said bottom, the inlet for the hot gases from the exhaust pipe being disposed at such lowest point so that whenever the engine is stopped the solid particles within the casing will flow through said entrance into the exhaust pipe.

4. An attachment for improving the operation of internal combustion engines having a carburetor, an intake manifold leading from the carburetor to the engine cylinders, and an exhaust pipe for the products of combustion, the attachment comprising a casing mounted in vertical position on the exhaust pipe at a point where the exhaust gases are at a high temperature, a screen for screening the hot gases disposed within the casing, a distributing plate adapted to be located between the carburetor and the intake manifold, a connecting pipe for leading the hot gases from the casing to the distributing plate, said attachment including a metering orifice of predetermined size to permit flow therethrough and through the attachment from the exhaust pipe to the intake manifold of a volume of hot gases as determined by said orifice, said casing having an entrance into the bottom thereof from the exhaust pipe and being provided with a dished bottom, the entrance for the hot gases being disposed at the lowest point thereof so that solid particles removed from the gases by the screen and collected on the dish-shaped bottom will flow by gravity into the exhaust pipe whenever the engine is stopped.

5. An internal combustion engine having the attachment of claim 1 combined therewith.

References Cited by the Examiner

UNITED STATES PATENTS

| | | | |
|---|---|---|---|
| 1,788,578 | 1/1931 | Lord | 123—119 |
| 2,047,743 | 7/1936 | Moore | 123—119 |
| 2,317,582 | 4/1943 | Bicknell | 123—119 |
| 2,354,179 | 7/1944 | Blanc | 123—119 |
| 2,757,654 | 8/1956 | White | 123—119 |

MARK NEWMAN, *Primary Examiner.*

KARL J. ALBRECHT, *Examiner.*

A. L. SMITH, *Assistant Examiner.*